United States Patent
Nies et al.

(10) Patent No.: US 7,948,100 B2
(45) Date of Patent: May 24, 2011

(54) BRAKING AND POSITIONING SYSTEM FOR A WIND TURBINE ROTOR

(75) Inventors: Jacob Johannes Nies, Zwolle (NL); Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 11/959,540

(22) Filed: Dec. 19, 2007

(65) Prior Publication Data
US 2009/0162202 A1    Jun. 25, 2009

(51) Int. Cl.
 *F03D 9/00* (2006.01)
 *H02P 9/04* (2006.01)
 *G05B 19/40* (2006.01)

(52) U.S. Cl. .......................... 290/44; 318/685
(58) Field of Classification Search .............. 290/44; 318/685
See application file for complete search history.

(56) References Cited

U.S. PATENT DOCUMENTS

| | | | | |
|---|---|---|---|---|
| 4,160,170 A * | 7/1979 | Harner et al. | ............ | 290/44 |
| 4,161,658 A * | 7/1979 | Patrick | ............ | 290/44 |
| 4,189,648 A * | 2/1980 | Harner | ............ | 290/44 |
| 4,193,005 A * | 3/1980 | Kos et al. | ............ | 290/44 |
| 4,584,486 A * | 4/1986 | Quynn | ............ | 290/44 |
| 4,695,736 A * | 9/1987 | Doman et al. | ............ | 290/44 |
| 4,700,081 A * | 10/1987 | Kos et al. | ............ | 290/44 |
| 4,703,189 A * | 10/1987 | DiValentin et al. | ............ | 290/44 |
| 5,844,394 A * | 12/1998 | Mushika et al. | ............ | 318/696 |
| 6,100,662 A * | 8/2000 | Hansen | ............ | 318/685 |
| 6,222,340 B1 * | 4/2001 | Kawabata et al. | ............ | 318/685 |
| 6,555,985 B1 * | 4/2003 | Kawabata et al. | ............ | 318/685 |
| 6,873,129 B1 * | 3/2005 | Leverett et al. | ............ | 318/605 |
| 6,909,256 B2 * | 6/2005 | Itabashi | ............ | 318/685 |
| 7,099,247 B2 * | 8/2006 | Takayama et al. | ............ | 369/47.45 |
| 7,279,802 B2 * | 10/2007 | Pasuri | ............ | 290/44 |
| 7,550,864 B2 * | 6/2009 | Anderson et al. | ............ | 290/55 |
| 7,582,977 B1 * | 9/2009 | Dehlsen | ............ | 290/1 R |
| 7,586,205 B2 * | 9/2009 | Krueger | ............ | 290/44 |
| 7,629,702 B2 * | 12/2009 | Schubert | ............ | 290/44 |
| 7,821,216 B2 * | 10/2010 | Akiyama | ............ | 318/432 |
| 2003/0075929 A1 * | 4/2003 | Weitkamp | ............ | 290/55 |
| 2006/0244264 A1 * | 11/2006 | Anderson et al. | ............ | 290/44 |
| 2007/0187954 A1 | 8/2007 | Struve et al. | ............ | 290/44 |
| 2010/0230966 A1 * | 9/2010 | Pavlak | ............ | 290/44 |
| 2010/0280733 A1 * | 11/2010 | Jordan et al. | ............ | 701/100 |

\* cited by examiner

*Primary Examiner* — T C Patel
*Assistant Examiner* — Pedro J Cuevas
(74) *Attorney, Agent, or Firm* — Global Patent Operation; Douglas D. Zhang

(57) ABSTRACT

A method of positioning a wind turbine rotor comprises defining a predetermined angular position in a main rotation plane of the rotor and controlling a rate of deceleration of the rotor, such as to stop the rotor at the predetermined angular position.

20 Claims, 3 Drawing Sheets

BRAKING AND POSITIONING SYSTEM FOR A WIND TURBINE ROTOR

BACKGROUND OF THE INVENTION

The present invention relates to braking and positioning methods for a rotor of a wind turbine, more specifically for positioning a rotor at a desired position, e.g. before engaging a locking mechanism. It further relates to wind turbines adapted to carry out the described methods.

Wind turbines are commonly used to convert kinetic energy of an air stream into electric energy. An essential part of a wind turbine is the rotor with rotor blades, which captures the kinetic energy and converts it into rotational energy. For maintenance purposes, it is necessary to fixate the rotor with respect to the wind turbine nacelle in order to avoid any turning movement, which may pose a threat to the maintenance personnel. Conventionally, this requires a cumbersome process involving two persons. One person is located near the low speed shaft, often under highly uncomfortable or even dangerous conditions, and communicates the angular position of the shaft respectively the rotor to a second person controlling the break at the high speed shaft. Once the rotor is positioned in a suitable angular position, a locking mechanism is applied. This kind of rotor lock may be, for example, implemented as a movable bolt and a respective bore or groove in the shaft. At standstill of the rotor, and when the bolt and the bore are aligned, the bolt is manually or automatically moved to engage with the bore. The bolt can only be engaged with the bore in a particular angular position of the rotor.

There is therefore a need for a method and system for the positioning of a rotor of a wind turbine at a predetermined angular position.

BRIEF DESCRIPTION OF THE INVENTION

In view of the above, there is provided a method according to claim 1, a method according to claim 14. Further aspects, advantages and features of the present invention are apparent from the dependent claims, the description and the accompanying drawings.

According to a first aspect of the invention, a method of positioning a wind turbine rotor is provided. It comprises defining a predetermined angular position and controlling a rate of deceleration of the rotor such as to stop the rotor at the predetermined angular position.

The present invention allows for the reliable and quick positioning of a wind turbine rotor at a predetermined angular position. It concerns the moving of a rotor which is initially at standstill or in slow movement, as well as braking and positioning a moving rotor. Embodiments of the invention may be advantageously applied for maintenance purposes, when the rotor shall be fixated at a given angular position, e.g. in order to engage a locking mechanism. As manual turning activities become unnecessary, also EHS (environmental health & safety) is improved. Embodiments of the invention relate to the acceleration of a rotor via the use of the pitch system, the intermittent use of the generator as a motor, and the use of energy stored in an accumulator for accelerating the rotor. Further embodiments relate to the deceleration of the rotor by using the pitch system, the torque of the generator, the feeding of rotational energy of the rotor into an accumulator, and the dissipation of rotational energy in an element of the drive train, e.g. a valve or throttle.

According to a second aspect of the invention, a method of positioning a wind turbine rotor is provided, which comprises defining a predetermined angular position, controlling a rate of deceleration of the rotor, such as to stop the rotor at the predetermined angular position, controlling a pitch angle of at least one rotor blade of the wind turbine rotor such as to cause a wind-induced torque on the rotor, thereby decelerating the rotor at the controlled rate, and engaging a locking mechanism to secure the rotor at the predetermined angular position.

According to a third aspect of the invention, a wind turbine is provided, which comprises an electrical generator adapted to be selectively used as a motor, a control unit adapted for switching between a generator operation and a motor operation of the electrical generator and for controlling the torque generated by the generator when used as a motor. The control unit monitors a sensor signal indicating the angular position of the rotor in its main rotation plane.

According to a fourth aspect of the present invention, a method of positioning a wind turbine rotor is provided, which comprises defining a predetermined angular position in a main rotation plane of the rotor, and feeding energy into an electrical generator of the wind turbine in order to use it as a motor and thereby move the rotor to the predetermined angular position.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION OF THE INVENTION

Figure 1:
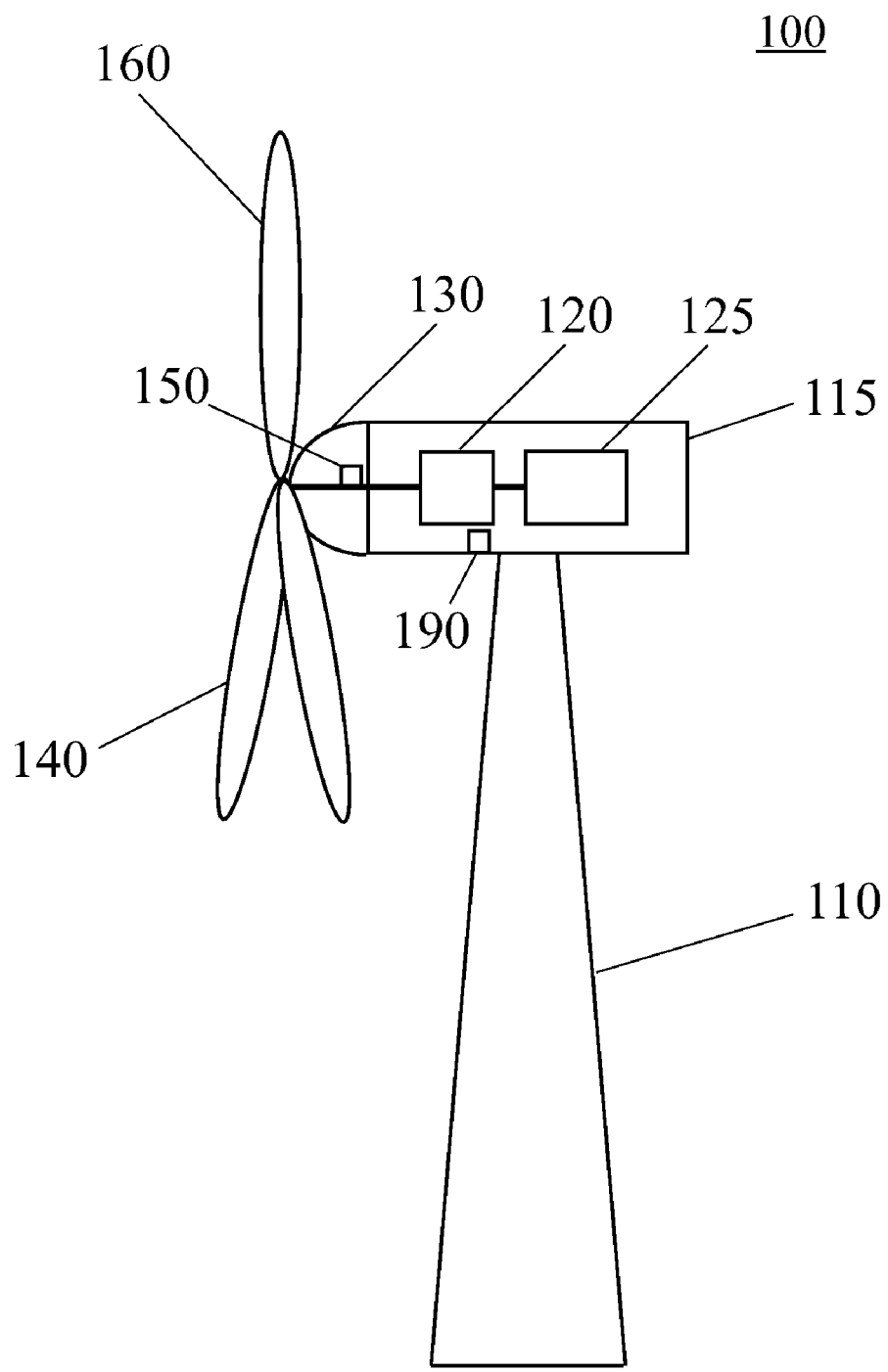
FIG. 1 shows a perspective view of a typical wind turbine.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations. In the figures same reference numerals denote the same or similar parts.

FIG. 1 is a schematic view of a conventional wind turbine. The wind turbine 100 includes a tower 110 to which a machine nacelle 115 is mounted at its top end. The nacelle houses a drive train to which a gearbox 120 is connected. The output of the gearbox is connected to a main electric generator 125. The rotor 160 comprises a hub 130 bearing three rotor blades 140, and is mounted to a lateral end of the machine nacelle 115. The rotor blades 140 can be adjusted by a pitch drive 150 which is typically accommodated inside hub 130. The wind turbine 100 further includes at least one sensor 190.

Various algorithms and computer programs or programs are described as part of embodiments of the invention. A skilled person is able to derive their specific characteristics from the described functionalities by applying his knowledge and experience. Therefore, the details are not laid out in each case.

Figure 2:
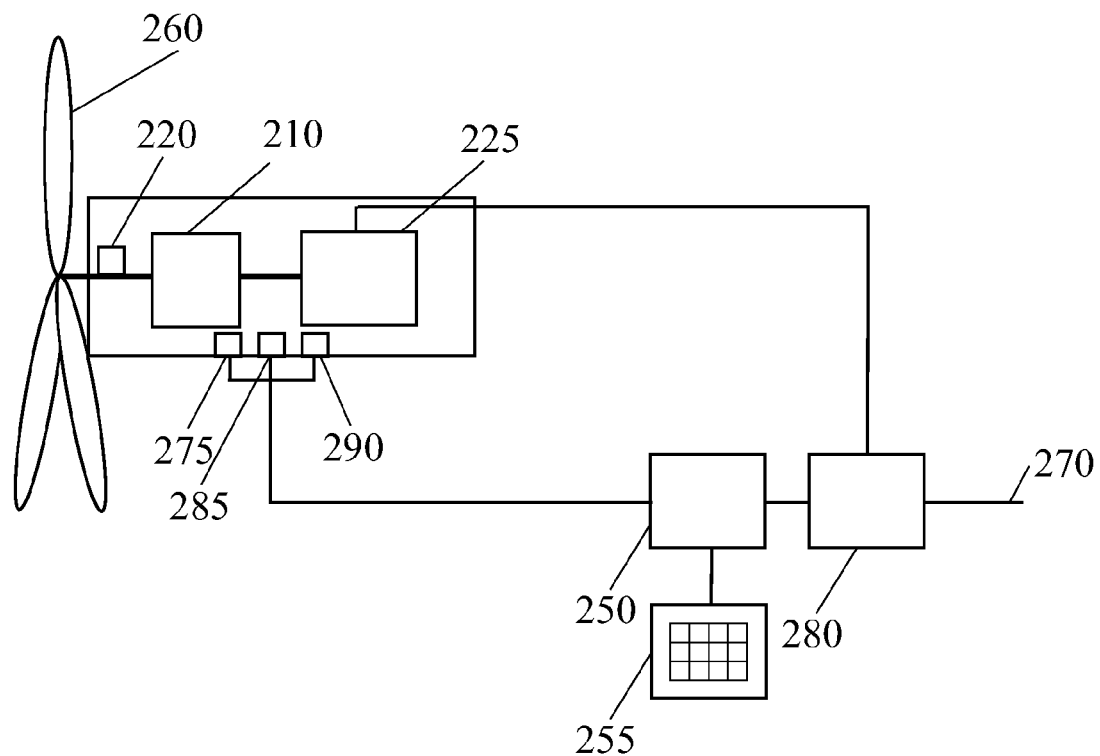
FIG. 2 shows a schematic view of a first embodiment of the invention.

FIG. 2 shows a schematic view of a first embodiment of the invention, wherein the power conversion system of a wind turbine is used to convert kinetic energy of the rotor during a braking event. The torque of the wind turbine generator 225 is used to decelerate the turning rotor 260 in order to stop it at a predefined or predetermined angular position in its main rotation plane, while feeding rotational energy of the rotor into the generator. The torque of the generator 225 is controlled via a control unit 250 and a frequency converter 280 in order to reduce the rotational speed of the rotor. The rate of deceleration is a function of the generator torque. During the braking process, energy is fed into the power grid 270. In conventional wind turbine systems, the generator is decoupled from the electrical power grid 270 below a certain rotational speed of the rotor, called coupling speed or cut-in-frequency. This is carried out using the frequency converter 280. Such a behavior would conflict with the desired controlled deceleration of the rotor until very low speed or standstill by means of the generator torque. Accordingly, in the present embodiment, the generator is coupled to the power grid 270 until standstill. Therefore, the controlling section of the wind turbine is adapted to run a program adapted to control the frequency converter in accordance with these requirements.

In case an option of deceleration until standstill is chosen via a control panel 255, the control unit will keep the power generator coupled to the grid 270 until standstill of the rotor 260. During deceleration of the rotor, typically the generator torque, rotational speed and angular position of the rotor are monitored via detection means 275, 285, 290, e.g. sensors, which are coupled to the control unit 250. Suitable detection means and methods for monitoring are well known to a skilled person. In accordance with the predefined target angular position of the rotor, the control unit 250 controls the torque exerted by the generator on the rotor via the shaft and gearbox 210. During deceleration, the control unit 250 is calculating the estimated standstill position of the rotor based on the monitored data, particularly the current position of the rotor and its rotational speed. The control unit is adapted to run a dedicated program for this purpose. Suitable methods and algorithms are well known to the skilled person. The control unit may further comprise a set of stored predetermined parameters which typically relate to experimental braking data from pre-run tests or from previous braking events, which are taken into account during calculations. If the control unit determines that the calculated estimated standstill position deviates from the predetermined angular position, the control unit 250 adapts the torque of the generator via the frequency converter 280 in order to increase or decrease the rate of deceleration. This is carried out constantly or in frequent time intervals, e.g. 0.1 to 0.5 seconds. When the estimated standstill position is in accordance with the predetermined position, the rate of deceleration, i.e. generator torque, is kept constant. When the speed of the rotor has decreased to a predefined value, the generator torque is reduced by the control unit in order to enable a smooth transition to standstill.

After the predefined angular position of the rotor has been established, a locking mechanism 220 may be engaged, e.g. by engaging a hydraulically movable bolt attached to a solid part of the wind turbine nacelle with a nut in the rotor hub. Eventually, a secondary braking mechanism such as a disc brake is applied before, after or instead of applying the lock.

Generally, the predefined angular position of the rotor has to be determined at least once before a first beginning of operation of the wind turbine. That is, the angular position at which the locking mechanism can be engaged has to be defined and be stored in a control unit of the wind turbine. In order to do so, a self-learning process may be carried out during assembly of the turbine in which this position is defined. There are a variety of ways to implement such a process, which a person skilled in the art can derive from his knowledge. By way of example, the rotor may be roughly moved to an angular position which is, due to knowledge about the constructive details, known to be close to the target position. Then, the rotor can be slowly moved to either side by trimming the pitch of the blades, with the rotor hub directing into the direction of the wind. During the slow movement, it is constantly attempted to engage the locking mechanism. Once the locking mechanism is engaged, the exact angular position of the rotor is stored in a memory of the control unit. In order to further increase precision, the process may be repeated, wherein the rotor is moved to the found position from the other direction in order to compensate for mechanical tolerances resulting e.g. from the gear box.

The described method may be applied in wind turbines with or without a drive train, e.g. also in wind turbines where the generator is directly coupled to the rotor axis without an intermediate gearbox.

Particularly suitable for the above purpose are full power conversion systems in combination with a permanent magnet generator.

In an alternative method for the control of the generator torque, the control unit calculates a path-time-diagram or speed-time-diagram before or during the deceleration phase. By detecting a current angular position or the rotational speed of the rotor at specific time intervals and calculating a deviation from a previously calculated target value at this time, the generator torque is adapted as a function of the deviation by the control unit. Suitable methods and algorithms for this purpose are well known to a skilled person. Typically, a proportional-integral-derivative controller (PID-Controller) is used for the calculations in the control unit.

The above described method for braking or positioning a wind turbine rotor may also be applied by means of a disc brake or eddy current brake as a torque generating unit instead of an electrical generator. In this case, the control unit controls the braking force in a similar manner as when using a generator as described above. The rate of deceleration is a function of the braking torque or braking force in this case.

An advantage of the described system is that the control unit may vary the amount of braking force exerted during a braking event. By doing so, disadvantageous effects like resonances in the structure of the wind turbine caused by the braking process can be controlled and avoided effectively. This is especially useful as conventional braking systems, e.g. disc brakes, often cause unwanted mechanical stress due to an application of braking force with fixed strength, without taking into account the possible occurrence of resonances and the like caused by the braking process. Accordingly, the described system can also be advantageously applied for regular braking events, and not only for the purpose of positioning the rotor. The system may thus be used to replace or complement a conventional mechanical braking system.

During normal operation of the wind turbine, i.e. when it is not intended to fixate the rotor at a predetermined position, the generator will be decoupled from the power grid 270 below the coupling speed or cut-in-frequency as in conventional systems by means of the frequency converter 280. The control unit 250 and frequency converter 280 are adapted in order to switch between this standard operation mode and the braking and positioning mode described above. To this end, the frequency converter and control unit are adapted to selectively connect/disconnect the electrical generator to or from the power grid below a predetermined coupling speed.

In an embodiment, at least a part of the energy fed to the generator may be supplied or fed to the control unit, preferably from an intermediate circuit of a frequency converter of the wind turbine. In this case, the control function of the control unit may be maintained even during power-failures, times without availability of electrical power or malfunctions.

Figure 3:
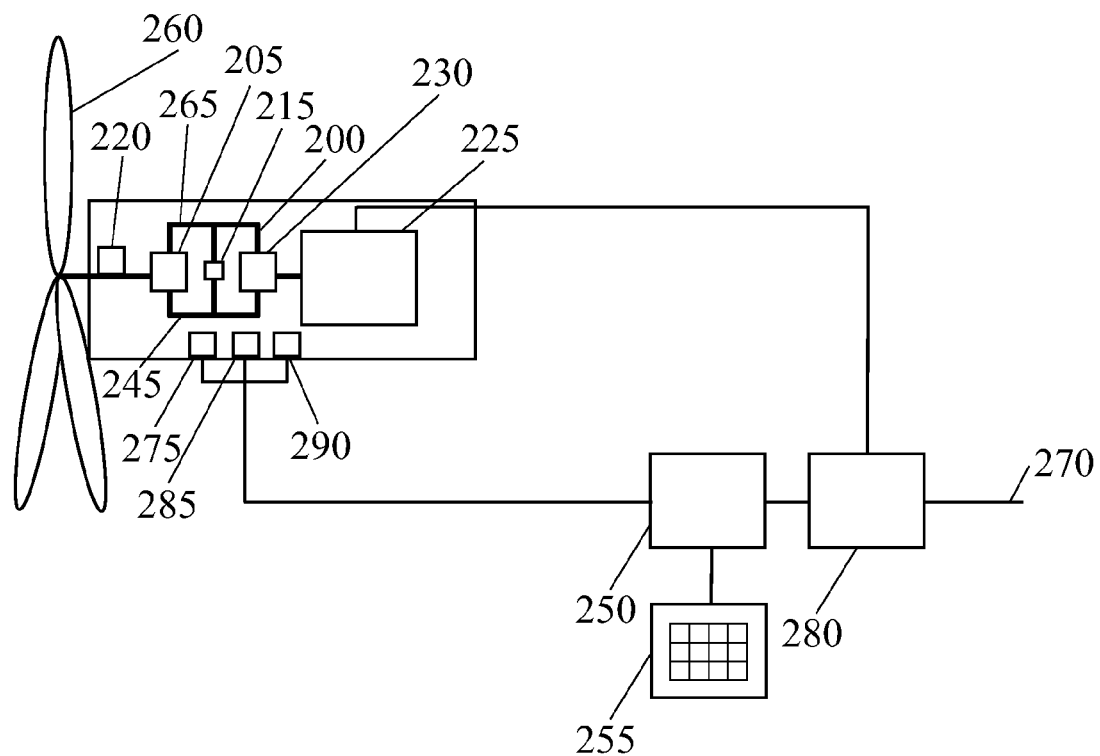
FIG. 3 shows a schematic view of a further embodiment of the invention.

FIG. 3 shows a further embodiment of the invention, which relates to a system with the above described braking or positioning functionality for a wind turbine with a hydrostatic or hydraulic drive train 200, wherein the rotational energy of the rotor 260 is fed by a pump system 205, which is operatively connected to the rotor, to the drive train. The pump 205 is controlled to deliver a defined braking torque in accordance with the braking requirements determined by the control unit 250. As in the previous embodiment, detection means 275, 285, 290 are used to typically detect torque, rotational speed of the rotor and the actual angular position of the rotor. The pump 205 may be regulated by actively controlling the relief valve 215, which is situated between the high pressure part 265 and the low pressure part 245 of the hydraulic system, or by consuming more or less power in the hydraulic or hydrostatic motor 230 driving the generator 225. By regulating the torque exerted by the drive train 200 on the rotor 260, the rotor is decelerated in the desired manner and stopped at the predetermined angular position to allow the locking of a locking mechanism. Apart from the different power transmission via a hydraulic or hydrostatic system, the system works in a similar way as the embodiment with a mechanical drive train described above. Alternatively to dissipating the energy in a hydraulic motor, it can be dissipated in an accumulator (not shown) or the relief valve 215.

Figure 4:
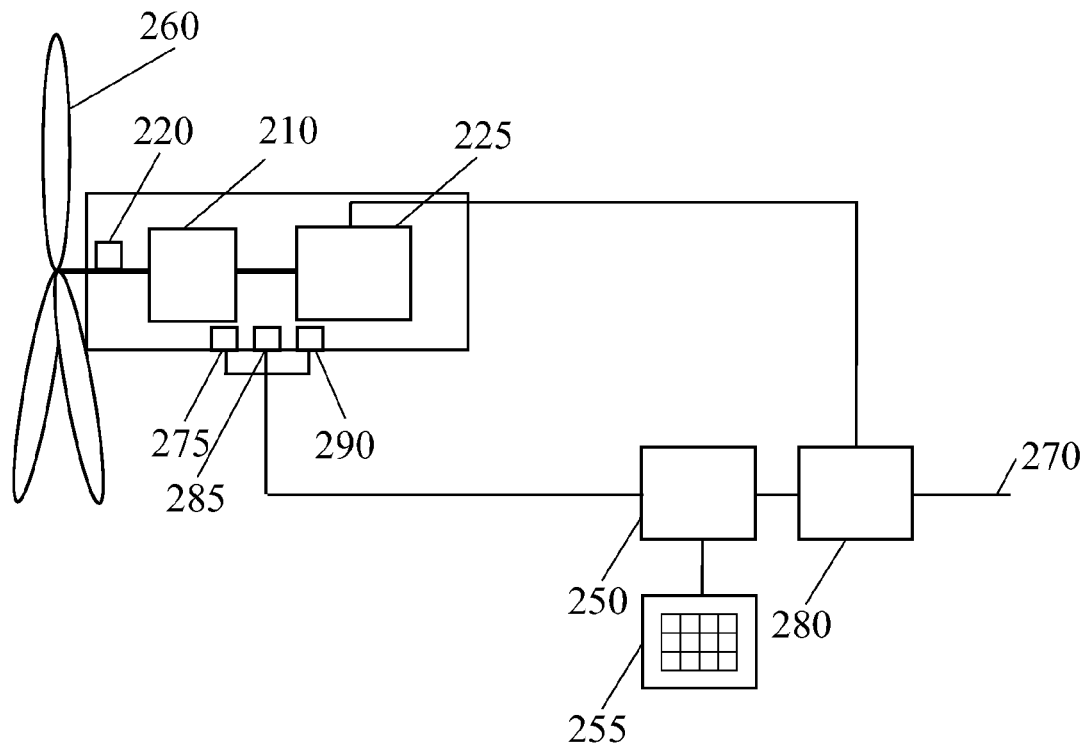
FIG. 4 shows a schematic view of a further embodiment of the invention.

FIG. 4 shows a further embodiment of the present invention, which allows the defined positioning of the rotor 260, achieved by actively turning the rotor via the electrical generator 225. This is carried out by feeding energy into the generator 225 with help of the frequency converter 280. Consequently, a rotating magnetic field is induced and the generator is temporarily and selectively used as an electrical motor. This process is controlled via the control unit 250 and initiated by a respective input of a user into control panel 255. The frequency converter 280 and the control unit 250 of the wind turbine are adapted to serve this purpose. The generator fed with electrical energy can then be used to turn and position the drive train including the rotor with defined speed, direction and torque. The energy for the turning of the rotor may be taken from the power grid 270 or from an electrical accumulator (not shown). By using detection means 275, 285, 290 to detect parameters such as angular position of the rotor, rotational speed and motor torque, and by adapting the rotational speed and motor torque via the control unit 250, the rotor can be precisely positioned at a desired angular position, after which a locking mechanism 220 may be engaged.

In order to enable the wind turbine generator to be used as a motor, modifications to the layout of the electrical system have to be carried out. In case of a synchron generator, an external excitation system is provided to enable excitation at low speed. In case of a double feed generator, an extra jumper or switch is needed to short the stator windings in case of operation as a motor. In case of a generator with permanent magnets, no modification to the generator is necessary. In this case, typically only the frequency converter 280 and the control unit have to be adapted.

In case the wind turbine comprises a hydraulic or hydrostatic drive train, energy from the accumulator or from ancillary equipment may be used to position the rotor in the manner described above. Also, energy from the generator used as a motor may be used. In reverse, the energy from the intermediate circuit can be used to rotate the generator.

One of the advantageous aspects of the above embodiment is that the rotor may be turned into a position where the locking mechanism can be applied even during very calm conditions, when the wind force is not strong enough to move the rotor out of a standstill position. Furthermore, an advanced generator alignment process may be realized by turning the generator into measuring positions in forward and backward direction. Also, during negative gusts the movement of the rotor may be supported by the described system, and during long periods of calm weather the rotor may be temporarily slowly rotated to avoid the build-up of standstill marks on moving parts. Additionally devices for turning the rotor, like additional electrical drives, may be abandoned. The greater part of these advantages is also a benefit of the embodiment described below.

Figure 5:
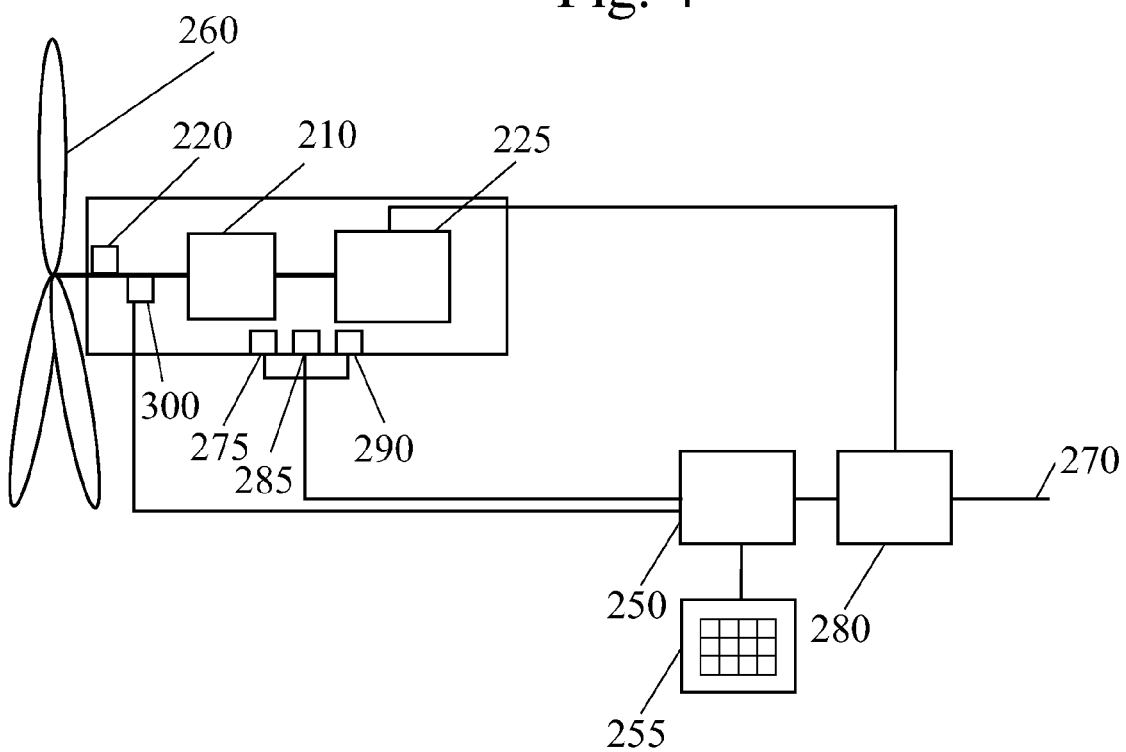
FIG. 5 shows a schematic view of a further embodiment of the invention.

FIG. 5 shows another embodiment of the present invention concerning the positioning of the rotor 260 via the use of the pitch system 300. The rotor is directed at a desired position by using the torque exerted by the wind. In the present embodiment, this process is automatically performed. To this end, the control unit 250 is adapted to control the pitch angle of at least one rotor blade such as to cause a wind-induced torque on the rotor, in order to direct or move the rotor to a predetermined angular position suitable for engaging the rotor locking mechanism 220. Mechanisms to manipulate the pitch angle of rotor blades of wind turbines are well known to those skilled in the art. As a non-limiting example, the rotor is at standstill and shall be positioned at a predetermined angular position for maintenance. In this case, a person enters a respective command into the control panel 255, from where it is transferred to the control unit 250. The control unit is adapted to run a designated program for the purpose of moving the rotor to a desired position via control of the pitch angle. According to current operation parameters of the wind turbine acquired by detection means, which may e.g. comprise torque sensors and rotational speed sensors 275, 285, and the current wind speed, the program calculates a pitch angle for one or a plurality of rotor blades. The angle is calculated in order to cause a wind-induced torque on the rotor which drives the rotor with a predetermined rotational speed into the direction of the predetermined angular position. During the process, an estimated standstill position is calculated based on sensor data, and optionally predetermined parameters, and the pitch angle of the at least one rotor blade is adapted if the estimated standstill position deviates from the predetermined angular position. In this manner, the rotor can be precisely positioned at a desired angular position, after which the locking mechanism 220 may be engaged. The described method may be also applied for decelerating, e.g. braking, a turning rotor or a rotor that is in slow movement.

In an alternative method for the calculation of the pitch angle, the control unit calculates a path-time-diagram or speed-time-diagram before or during the deceleration phase. By detecting a current angular position or the rotational speed of the rotor at specific time intervals and calculating a deviation from a previously calculated target value at this time, the pitch angle of at least one rotor blade is adapted as a function of the deviation by the control unit. Suitable methods and algorithms for this purpose are well known to a skilled person. Typically, a proportional-integral-derivative controller (PID-Controller) is used for the calculations in the control unit.

In the above-described manner, there are a number of alternatives for reaching a predetermined angular position of the rotor. If the rotor is initially in a standstill position, it may be accelerated and positioned by means of the wind force. Alternatively, if the rotor is turning before initiating the process described above, it may be decelerated or braked by using the torque exerted by the wind. Depending thereupon, the control program of the control unit 250 is adapted to apply different strategies in controlling the pitch of the at least one rotor blade.

What is claimed is:

1. A method of positioning a wind turbine rotor, the method comprising:
    defining a predetermined angular position in a main rotation plane of the rotor; and
    stopping the rotor at the predetermined angular position by controlling a rate of deceleration of the rotor,
    wherein the angular position and rotational speed of the rotor are monitored during deceleration, an estimated standstill position is calculated, a deviation of the estimated standstill position from the predetermined angular position is determined, and the rate of deceleration is adapted depending on the determined deviation.

2. The method of claim 1, wherein the wind turbine comprises a generator to produce electricity, the rotational energy of the rotor is fed into the generator, and the rate of deceleration is a function of the generator torque.

3. The method of claim 2, wherein the angular position of the rotor, the generator torque and the rotational speed are monitored by a control unit.

4. The method of claim 3, wherein at least part of the energy fed into the generator is supplied to the control unit.

5. The method of claim 2, wherein the generator remains coupled to a power grid until the rotor reaches standstill.

6. The method of claim 1, wherein the wind turbine comprises a brake, the rotational energy of the rotor is dissipated in the brake, and the rate of deceleration is a function of the braking torque.

7. The method of claim 6, wherein the brake is chosen from the group consisting of a disc brake, and an eddy current brake.

8. The method of claim 1, further comprising feeding rotational energy of the rotor into a drive train of the wind turbine, thereby decelerating the rotor at the controlled rate.

9. The method of claim 8, wherein the drive train is chosen from the group consisting of a hydraulic drive train, and a hydrostatic drive train.

10. The method of claim 9, wherein the rotational energy of the rotor is dissipated in a valve of the drive train.

11. The method of claim 1, further comprising engaging a locking mechanism to secure the stopped rotor at the predetermined angular position.

12. The method of claim 1, further comprising detecting rotational speed and angular position of the rotor, wherein
    the controlling the rate of deceleration of the rotor is based on the detected rotational speed and angular position.

13. The method of claim 1, wherein the controlling the rate of deceleration of the rotor is undertaken by means of a proportional-integral-derivative controller.

14. A method of positioning a wind turbine rotor, the method comprising:
    defining a predetermined angular position in a main rotation plane of the rotor; and
    stopping the rotor at the predetermined angular position by controlling a rate of deceleration of the rotor,
    wherein the controlling the rate of deceleration of the rotor comprises detecting an angular position of the rotor at a specific time, calculating a deviation from a previously calculated target value at this time, and adapting the rate of deceleration as a function of the deviation.

15. The method of claim 14, wherein the controlling the rate of deceleration of the rotor is undertaken by means of a proportional-integral-derivative controller.

16. The method of claim 14, wherein the wind turbine comprises a generator to produce electricity, the rotational energy of the rotor is fed into the generator, and the rate of deceleration is a function of the generator torque.

17. The method of claim 14, wherein the wind turbine comprises a brake, the rotational energy of the rotor is dissipated in the brake, and the rate of deceleration is a function of the braking torque.

18. The method of claim 14, further comprising feeding rotational energy of the rotor into a drive train of the wind turbine, thereby decelerating the rotor at the controlled rate.

19. The method of claim 18, wherein the drive train is chosen from the group consisting of a hydraulic drive train, and a hydrostatic drive train.

20. The method of claim 19, wherein the rotational energy of the rotor is dissipated in a valve of the drive train.

* * * * *